B. G. LAMME.
SYSTEM OF CONTROL FOR ELECTRIC MOTORS.
APPLICATION FILED SEPT. 26, 1910.
1,066,507.
Patented July 8, 1913.
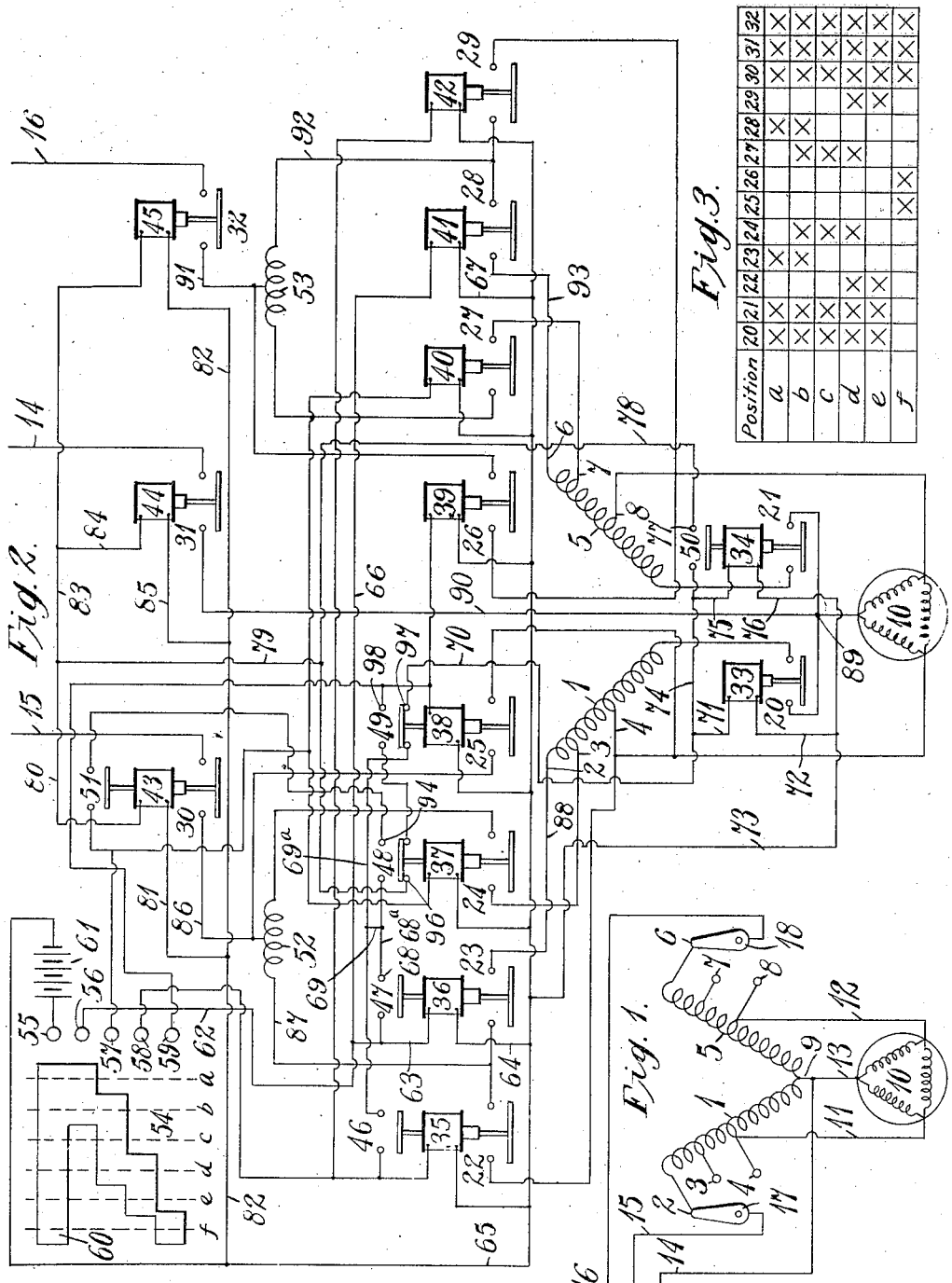
WITNESSES:
Fred H. Miller
D. H. Mace
INVENTOR
Benj. G. Lamme
BY
Chesley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR ELECTRIC MOTORS.

1,066,507.  Specification of Letters Patent.  Patented July 8, 1913.

Application filed September 26, 1910. Serial No. 583,886.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Systems of Control for Electric Motors, of which the following is a specification.

My invention relates to systems of control for electric motors and it has special reference to such systems as are adapted to control the starting operation of an induction motor of large capacity and relatively low voltage.

The object of my invention is to provide a system of the above-indicated class that shall be simple in arrangement and operation and especially adapted to reduce the size and expense of the switching apparatus usually employed in connection with the starting of motors of this type.

One of the notable advances in industrial and manufacturing enterprises in recent years has been the general demand and use of larger and more efficient machinery and driving units. In this connection, it has been necessary to increase the size and capacity of electrical machinery and apparatus, which has necessarily involved new operating conditions and difficulties, previously not encountered.

The development of polyphase induction motors of large capacities has been particularly marked, and the method of starting such motors has been a matter of considerable importance on account of the increased size and cost of the necessary switching apparatus.

The usual type of starting apparatus, or so called "auto-starter", for polyphase induction motors comprises two or more auto-transformers provided with several taps for the purpose of impressing an adjustable voltage upon the motor. The usual arrangement of switches is such that the motor connections are switched from low voltage taps to higher voltage taps or to the line voltage, after the motor is started. Sometimes, there is but a single step from the starting taps to the full-voltage running position, while, in other cases, there are several intermediate steps, thus giving a more gradual increase in voltage. In general, this type of autostarter is satisfactory, but, for motors of large capacities, it is inadequate, as the switches which transfer the motor connections from lower to higher taps are required to handle the excessive starting motor current, which is always much greater than the line current. For instance, if the motor is started at half voltage, the current in the motor leads is practically twice that of the supply circuit. In general, it may be said that the motor current has a ratio to the line current which is inversely proportional to the ratio of the motor and line voltages, at start.

The difficulty encountered with the usual type of auto-starters for motors of large size and relatively low voltages, resides in the excessive motor current to be switched. A heavy current is difficult and costly to handle, on account of the size and construction of the necessary switching apparatus, and it is to reduce this difficulty that my present system of control is intended.

According to my present invention, a plurality of auto-transformers are provided with taps, as in the usual arrangement, but, instead of switching the motor from one set of taps to another, the line connections are shifted in a similar manner. Hence, the switching apparatus is relieved of its usual severe operating conditions. The lowest voltage on the motor is obtained when the supply circuit is connected to the highest tap on the auto-transformers, and increases in motor voltage are secured by gradually shifting the line connections to lower taps. It is the line current, therefore, which is switched, instead of the motor current, and, in consequence, the current to be handled by the switching apparatus is smaller than in the usual arrangement. If several taps are used on the auto-transformers, it is usually the first taps which handle the heaviest current and the last taps which handle the least, by reason of the fact that the motor has gradually approached synchronism and the current has consequently been reduced.

My invention can better be understood by reference to the accompanying drawings, in which—

Figure 1 is an elementary schematic view, and Fig. 2 is a diagrammatic view, showing the complete circuit connections, of a system of control which embodies my invention. Fig. 3 is a table showing the switches of Fig. 2 which are finally closed in each position of the master controller.

Referring to Fig. 1, an auto-transformer 1 having a plurality of taps 2, 3 and 4 and a similar transformer 5 having a plurality of taps 6, 7 and 8 are V-connected at 9, according to well known practice. A three-phase induction motor 10 is permanently connected to taps 4, 8 and 9, through conductors 11, 12 and 13, respectively, and a conductor 14, of a three-phase supply circuit 14, 15 and 16, is also permanently connected between the transformer units 1 and 5 at point 9. Conductors 15 and 16 are respectively provided with suitable switching devices 17 and 18, by means of which said conductors may be connected to the various taps 2, 3, 4 and 6, 7, 8, respectively, as desired.

As shown, the supply circuit conductors 15 and 16 are connected to taps 2 and 6, respectively, and hence, it is evident that the lowest voltage is impressed upon the motor 10 for purpose of starting. After the motor 10 is started, the supply circuit connections may be advanced simultaneously to taps 3 and 7, through the agency of the switching devices 17 and 18, thereby increasing the voltage supplied to the motor 10.

The final step in the starting operation is to simultaneously shift the supply circuit connections of the conductors 15 and 16 to taps 4 and 8, respectively, through the switching devices 17 and 18, whence the motor 10 is connected directly to the supply circuit and full line voltage.

It will be observed that all of the switching is accomplished on the supply circuit conductors and hence the difficulties encountered in handling the heavy motor currents are obviated and smaller and less expensive switching apparatus may be employed.

If a greater number of intermediate voltage steps is desired, the switching devices 17 and 18 may be shifted alternately, in a manner similar to that hereinbefore described, whereby an increased number of more gradually graded steps is obtained.

Reference may now be had to Fig. 2, in which the system of control shown, comprises a sub-divided auto-transformer 1 having a plurality of taps 2, 3 and 4 and a similar auto-transformer 5 having a plurality of taps 6, 7 and 8; a polyphase induction motor 10 permanently connected to taps 4 and 8 of the auto-transformers 1 and 5 and adapted to receive energy therefrom; a three-phase supply circuit 14, 15 and 16; a plurality of switches 20 and 21 for inter-connecting the auto-transformers 1 and 5, according to the usual system of V-connections; a set of switches 22 to 29 for adjusting the supply circuit connections to the various taps on the auto-transformers 1 and 5; a set of switches 30 to 32 for governing the main supply circuit connections; a plurality of operating electro-magnets 33 to 45 for actuating the switches 20 to 32; a plurality of auxiliary switches 46 to 51 for interlocking the control circuits in order to constrain the operation of the switches 20 to 32 to a predetermined sequence; a plurality of choke-coils 52 and 53 to prevent injurious arcing on the switches 20 to 29; a master controller 54 for governing the control circuit connections of the operating electro-magnets 33 to 45, and comprising a plurality of stationary contact terminals 55 to 59 and a conducting segment 60 which is adapted to coöperate with said stationary contact terminals upon the position-indicating lines $a$, $b$, $c$, $d$, $e$, $f$, and a battery or other suitable source of energy 61 for supplying energy to the electromagnets 33 to 45.

Assuming the induction motor 10 to be at rest and the various connections to be as shown in Fig. 2, the operation of the system is as follows: If the conducting segment 60 is moved into contact with the stationary contact terminals 55 and 56, upon the position-indicating line $a$, a circuit is completed from the positive side of the battery 61, through stationary contact terminal 55, conducting segment 60, stationary contact terminal 56 and conductor 62, where the circuit divides, one branch including conductor 63, electro-magnet 36, conductor 64 and a conductor 65 to the negative side of the battery, and the other branch including conductor 66, electro-magnet 41, conductor 67 and conductor 65, to the negative side of the battery. Upon the completion of these circuits, the electromagnets 36 and 41 are energized and switches 23 and 28 are closed. As the switch 23 is closed, the auxiliary switch 47 engages the contact terminals 68 and a circuit is thus completed from the conductor 63, through switch 47, conductor 68$^a$, conductor 69, conductor 69$^a$, switch 49 and conductor 70, where the circuit divides, one branch including conductor 71, electro-magnet 33, conductor 72, conductor 73 and conductor 65, to the negative side of the battery, and the other branch traversing conductor 74, conductor 75, electro-magnet 34, conductor 76, conductor 73 and conductor 65, to the negative side of the battery. Having established the circuits just recited, the electromagnets 33 and 34 are energized, and switches 20 and 21 are closed. As the closure of the switch 21 is effected, auxiliary switch 50 engages the stationary contact terminals 77, and a circuit is completed from the conductor 74, through switch 50, conductor 78 and conductor 79, where the circuit divides, one path traversing conductor 80, electro-magnet 43, conductor 81, conductor 82 and conductor 65, to the negative side of the battery; a second path including conductor 83, conductor 84, electro-magnet 44, conductor 85, conductor 82 and conductor 65 to the negative side of the battery; and a third branch including conductor 83, electromagnet 45, conductor 82 and conductor 65, to the negative side of the battery. Thus, the electro-magnets 43, 44 and 45 are energized, and the closure of the switches 30, 31 and 32 is effected. Upon the closure of switches 30, 31 and 32, the supply circuit conductor 15 is connected to tap 2 of the auto-transformer 1, through switch 30, conductor 86, a portion of the choke coil 52, conductor 87, switch 23 and conductor 88; the supply circuit conductor 14 is connected to the V-connection 89 of the auto-transformers 1 and 5, through switch 31 and conductor 90; and the supply circuit conductor 16 is connected to tap 6 of the auto-transformer 5, through switch 32, conductor 91, a portion of the choke coil 53, conductor 92, switch 28, and conductor 93. It will be observed that the supply conductors 15 and 16 are connected to the full-voltage taps 2 and 6 of the auto-transformers 1 and 5, respectively, and hence, the lowest voltage is applied to the motor 10 for starting. As the conducting segment 60 is moved step-by-step into engagement with the stationary contact terminals 57, 58 and 59, along the position-indicating lines b, c, d, e and f, the connections of the supply circuit conductors 15 and 16 to the auto-transformers 1 and 5 are gradually shifted until the motor 10 is finally connected directly to the supply circuit.

On account of the simplicity and similarity of the control circuits to those hereinbefore described in detail, it is not considered necessary to trace each circuit which is established during the starting operation. A brief outline only of the mode of operation will be given, and it is believed that those skilled in the art will experience no difficulty in understanding the same and in tracing the control circuits therefor.

As the conducting segment 60 is moved into engagement with the stationary contact terminal 57, along the position-indicating line b, the electromagnets 37 and 40 are energized and the switches 24 and 27 are closed, thus connecting the supply conductors 15 and 16 to the auto-transformer taps 3 and 7, respectively. As the switch 24 is closed, the auxiliary switch 48 engages the upper contact terminals 94, and thus energy is also supplied to the electromagnets 33, 34, and 43, 44 and 45, through a circuit which includes stationary contact terminal 57, switch 51, switch 48 and switch 49. When the conducting segment 60 is moved into position c, the engagement with the stationary contact terminal 56 is discontinued and, hence, the electromagnets 36 and 41 are deënergized and switches 23 and 28 are opened to interrupt the supply circuit connections to taps 2 and 6 of the auto-transformers 1 and 5. Moreover, as the auxiliary switch 47 opens, the energizing circuit for the electro-magnets 33 and 34, which includes the stationary contact terminal 56, switch 47, and switch 49, is also discontinued. However, switches 20 and 21 are not opened, as energy is still supplied to the electro-magnets 33 and 34, through a multiple circuit hereinbefore indicated.

In position d, stationary contact terminal 58 is engaged and electro-magnets 35 and 42 are caused to close the switches 22 and 29, thus establishing supply circuit connections to taps 4 and 8 of the auto-transformers 1 and 5, respectively. As the switch 22 is closed, another energizing circuit for the electro-magnets 33 and 34 is established by way of stationary contact terminal 58, switch 46 and switch 49. The disengagement of conducting segment 60 and the stationary contact terminal 57 is effected in position e, and switches 24 and 27 are opened, thereby interrupting the supply circuit connections to the transformer taps 3 and 7. As the switch 24 is opened, the energizing circuit for the electromagnets 33 and 34, which includes stationary contact terminal 57, switch 51, switch 48 and switch 49, is interrupted, and the auxiliary switch 48 is caused to engage its lower contact terminals 96.

In the last operating position, f, the stationary contact terminal 59 is engaged, and electro-magnets 38 and 39 become energized and cause switches 25 and 26 to be closed, thus connecting the supply circuit conductors 15 and 16 directly to the transformer taps 4 and 8, respectively, and impressing full line voltage upon the motor 10. Upon the closure of switch 25, the auxiliary switch 49 disengages the lower contact terminals 97 and thereby interrupts the energizing circuit for the electro-magnets 33, 34 and 43, 44 and 45. Hence, switches 20 and 21 are allowed to open and the auto-transformers 1 and 5 are disconnected. However, concurrently with the disengagement of switch 49 from the lower contact terminals 97, its engagement with the upper contact terminal 98 is effected, and an energizing circuit for the electro-magnets 43, 44 and 45 is instantly established and includes stationary contact terminal 59, switch 49 and switch 48. Hence, energy is supplied to the electromagnets 43, 44 and 45 before said magnets become deënergized on account of the opening of switches 20 and 21, and, therefore, the line switches 30, 31 and 32 are maintained closed. It will also be observed that, in position f, the stationary contact terminal 58 is disengaged and the switches 22 and 29 are allowed to open, thus interrupting the supply circuit connections to the transformer taps 4 and 8 by way of the choke coils 52 and 53, respectively; and leaving the supply circuits 15 and 16 connected directly to the motor 10. Full line voltage is thus applied to the motor 10 and full running conditions are established.

As in Fig. 1, it will be observed that, all of the voltage adjustments are confined to the supply circuit conductors, so that the switching apparatus is not required to handle the excessive motor currents and may, therefore, be materially reduced in size and expense.

Those skilled in the art will readily understand that my invention is not restricted to the use of auto-transformers or to the specific circuit connections and arrangements hereinbefore shown and described. Obviously, various other arrangements for two-phase and three-phase operation may be effected without departing from the spirit of my invention, and I desire that all such modifications shall be included within its scope.

I claim as my invention:

1. In a system of control, the combination with a plurality of transforming devices, a supply circuit, and an electric motor permanently connected to said transforming devices, of means for shifting the connections of said supply circuit to said transforming devices and a single device for controlling the operation of said shifting means.

2. In a system of control, the combination with a plurality of transformers, a supply circuit, and an electric motor permanently connected to said transformers, of means for shifting said supply circuit connections to symmetrically located intermediate taps on said transformers, including those to which the motor is connected and thereby increasing the voltage applied to said motor and connecting said supply circuit directly thereto.

3. In a system of control, the combination with a plurality of transformers, a supply circuit connected thereto, and an electric motor permanently connected to intermediate taps on said transformers, of means dependent upon shifting the supply circuit connections to said transformers for gradually increasing the initial voltage applied to said motor and finally connecting said motor to said supply circuit.

4. In a system of control, the combination with a plurality of interconnected transformers, each provided with a plurality of symmetrically located intermediate taps, a supply circuit initially connected to the full-voltage taps of said transformers, and an electric motor permanently connected to symmetrically located intermediate taps, of means for gradually shifting said supply circuit connections step by step to said intermediate taps to which said motor is connected.

5. In a system of control, the combination with an auto-starter having different voltage taps, a supply circuit adapted to be connected thereto, and an induction motor permanently connected to certain of said taps, of means for successively shifting the supply circuit connections to said auto-starter taps and finally connecting said supply circuit to the taps to which said motor is connected, whereby the voltage on said motor is gradually raised to line voltage.

6. In a system of control, the combination with an auto-starter, a supply circuit adapted to be connected thereto, and an induction motor permanently connected to certain intermediate taps of said auto-starter, of a plurality of switches, and a single means for controlling the operation thereof, whereby the supply circuit connections to said auto-starter are shifted, for the purpose of starting the motor.

7. In a system of control, the combination with a plurality of V-connected auto-transformers, a supply circuit, and an electric motor permanently connected to certain intermediate taps of said auto-transformers, of switches for successively connecting the supply circuit to different voltage taps, including the motor taps, and a single device for controlling said switches.

8. In a system of control, the combination with an auto-starter, a supply circuit initially connected to the full-voltage taps thereof, and an induction motor permanently connected to intermediate taps on said auto-starter for the purpose of starting said motor, of means for gradually shifting said supply circuit connections to the taps to which said motor is permanently connected.

9. In a control system, the combination with a plurality of transformers, a supply circuit, an electric motor connected to intermediate taps on said transformers, and a plurality of choke coils, of a plurality of electrically operated switches and means for controlling the operation thereof, whereby said transformers are interconnected, said supply circuit is connected through said choke coils to the full voltage taps of said transformers, said supply circuit connections are shifted to said intermediate taps on said transformers through said choke coils, said choke coils are eliminated from the circuit and said transformers are disconnected, leaving said motor directly connected to said supply circuit.

10. In a control system, the combination with a plurality of auto-transformers having a plurality of intermediate taps, a supply circuit, a polyphase induction motor permanently connected to said intermediate taps, a plurality of choke coils and a plurality of electrically operated switches, of means for controlling the operation of said switches, whereby said auto-transformers are interconnected, said supply circuit is connected to said auto-transformers through said choke coils, said supply circuit connections are shifted step by step to said intermediate taps to which said motor is connected, said choke coils being in circuit, said choke coils are eliminated from the circuit and said auto-transformers are disconnected, leaving said motor connected directly to said supply circuit.

11. In a control system, the combination with a plurality of transformers, a supply circuit connected thereto, and an electric motor permanently connected to intermediate taps in said transformers, of a plurality of electro-responsive devices for effecting changes in the supply circuit connections and single means for controlling the energization of said electro-responsive devices.

12. In a system of control, the combination with an auto-starter having a plurality of different voltage taps, a supply circuit adapted to be connected thereto, and a motor permanently connected to certain of said taps, of a plurality of electromagnetically operated switches associated with the different voltage taps, and a master controller for effecting the operation of said switches in a predetermined sequence whereby said supply circuit connections are successively shifted to the taps to which said motor is connected.

In testimony whereof, I have hereunto subscribed my name this 20th day of Sept., 1910.

BENJ. G. LAMME.

Witnesses:
B. B. HINES,
M. C. MERZ.

---

Copies of this patent may be obtained for five cents each, by addressing the "Commissioner of Patents, Washington, D. C."